US006922766B2

(12) United States Patent
Scott

(10) Patent No.: US 6,922,766 B2
(45) Date of Patent: Jul. 26, 2005

(54) REMOTE TRANSLATION MECHANISM FOR A MULTI-NODE SYSTEM

(75) Inventor: Steven L. Scott, Eau Claire, WI (US)

(73) Assignee: Cray Inc., Seattle, WA (US)

( * ) Notice: Subject to any disclaimer, the term of this patent is extended or adjusted under 35 U.S.C. 154(b) by 149 days.

(21) Appl. No.: 10/235,898

(22) Filed: Sep. 4, 2002

(65) Prior Publication Data

US 2004/0044872 A1 Mar. 4, 2004

(51) Int. Cl.[7] .............................................. G06F 12/10
(52) U.S. Cl. ....................... 711/202; 711/205; 711/207; 711/220; 711/221; 370/395.3; 370/395.31; 370/389
(58) Field of Search ................................ 711/202, 205, 711/207, 220, 221; 370/395.3, 395.31, 389

(56) References Cited

U.S. PATENT DOCUMENTS

| | | | | |
|---|---|---|---|---|
| 5,430,850 A | * | 7/1995 | Papadopoulos et al. | 719/314 |
| 5,446,915 A | * | 8/1995 | Pierce | 712/11 |
| 5,560,029 A | * | 9/1996 | Papadopoulos et al. | 712/25 |
| 5,649,141 A | * | 7/1997 | Yamazaki | 711/206 |
| 5,860,146 A | * | 1/1999 | Vishin et al. | 711/207 |
| 5,897,664 A | * | 4/1999 | Nesheim et al. | 711/206 |
| 6,003,123 A | * | 12/1999 | Carter et al. | 711/207 |
| 2002/0169938 A1 | * | 11/2002 | Scott et al. | 711/207 |
| 2002/0172199 A1 | * | 11/2002 | Scott et al. | 370/389 |

OTHER PUBLICATIONS

Wood et al., "An In–Cache Address Translation Mechanism," pp 358–365, IEEE, 1986.*
Kontothanassis et al., "VM–Based Shared Memory on Low––Latency, Remote–Memory–Access Networks," pp 157–169, ACM, 1997.*
Chen et al., "UTLB: A Mechanism for Address Translation on Network Interfaces," pp 193–204, ACM, 1998.*
Scott, S., "Synchronization and Communication in the T3E Multiprocessor", *ASPLOS*, vol. II, (1996), pp. 26–36.

* cited by examiner

Primary Examiner—Stephen C. Elmore
(74) Attorney, Agent, or Firm—Schwegman, Lundberg, Woessner & Kluth, P.A.

(57) ABSTRACT

A remote translation mechanism for a multi-node system. One embodiment of the invention provides a method for remotely translating a virtual memory address into a physical memory address in a multi-node system. The method includes providing the virtual memory address at a source node, determining that the virtual memory address is to be sent to a remote node, sending the virtual memory address to the remote node, and translating the virtual memory address on the remote node into a physical memory address using a remote-translation table (RTT). The RTT contains translation information for an entire virtual memory address space associated with the remote node.

35 Claims, 10 Drawing Sheets

Physical address format

REMOTE TRANSLATION MECHANISM FOR A MULTI-NODE SYSTEM

FIELD OF THE INVENTION

The present invention relates generally to the field of computer memory systems, and more particularly to a remote translation mechanism for a multi-node system.

BACKGROUND OF THE INVENTION

Multiprocessor computer systems include a number of processing nodes connected together by an interconnection network. Typically, each processing node includes one or more processors, a local memory, and an interface circuit connecting the node to the interconnection network. The interconnection network is used for transmitting packets of information between processing nodes.

Distributed, shared-memory multiprocessor systems include a number of processing nodes that share a distributed memory element. By increasing the number of processing nodes, or the number of processors within each node, such systems can often be scaled to handle increased demand. In such a system, each processor is able to access local memory, or memory of other (remote) processing nodes. Typically, a virtual address is used for all memory accesses within a distributed, shared-memory multiprocessor system, and is translated into a physical address in the requesting node's translation look-aside buffer (TLB). Thus, the requesting node's TLB will need to contain address translation information for all the memory that the node is able to access (local or remote). This amount of address translation information can be substantial, and can result in much duplication of translation information throughout the multiprocessor system (e.g., if the same page of memory is accessed by 64 different nodes, the TLB used by each node will need to contain an entry for that page). This type of system does not scale efficiently to very large numbers of processors.

Therefore, there is a need for an address translation mechanism in a multiprocessor system that addresses these and other shortcomings.

SUMMARY OF THE INVENTION

To address these and other needs, various embodiments of the present invention are provided. One embodiment of the invention provides a method for remotely translating a virtual memory address into a physical memory address in a multi-node system. The method includes providing the virtual memory address at a source node, determining that the virtual memory address is to be sent to a remote node, sending the virtual memory address to the remote node, and translating the virtual memory address on the remote node into a physical memory address using a remote-translation table (RTT). The RTT contains translation information for an entire virtual memory address space associated with the remote node.

Another embodiment of the invention provides a method for translating a virtual memory address in a multi-node system. The method includes providing a virtual memory address on a local node by using a virtual address of a load or a store instruction, identifying a virtual node associated with the virtual memory address, and determining if the virtual node corresponds to the local node. If the virtual node corresponds to the local node, then the method includes translating the virtual memory address into a local physical memory address on the local node. If, instead, the virtual node corresponds to a remote node, then the method includes sending the virtual memory address to the remote node, and translating the virtual memory address into a physical memory address on the remote node.

These and other embodiments will be described in the detailed description below.

DETAILED DESCRIPTION

Figure 1:
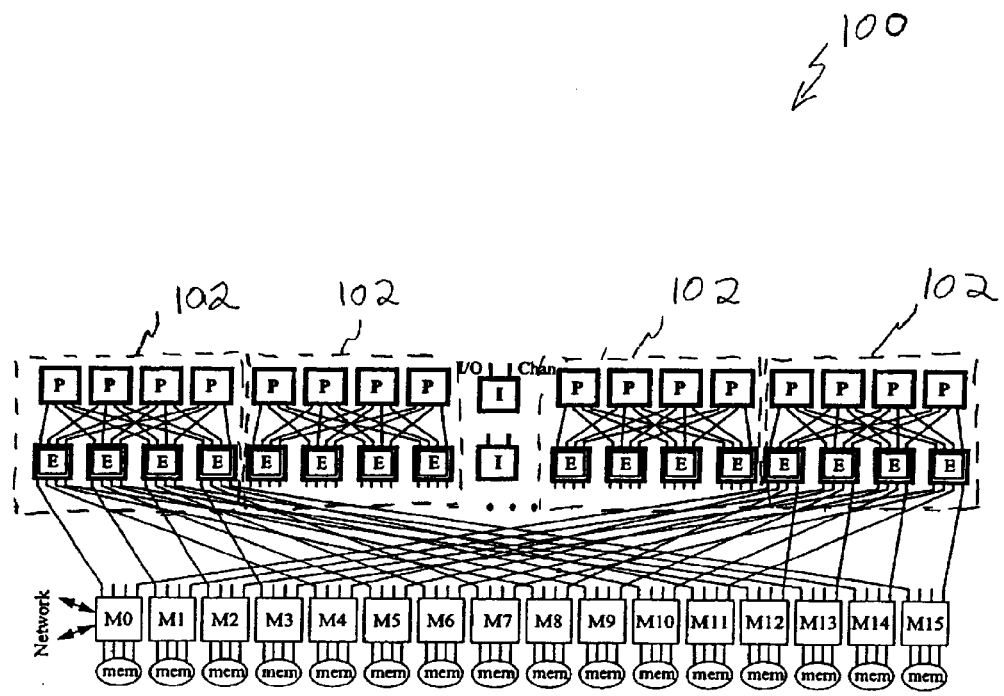
FIG. 1 illustrates a block diagram of a node that includes four multi-streaming processors, according to one embodiment of the present invention.

A novel system and method for remote translation of memory addresses is described herein. In the following detailed description of the embodiments, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. It is also to be understood that the various embodiments of the invention, although different, are not necessarily mutually exclusive. For example, a particular feature, structure or characteristic described in one embodiment may be included within other embodiments. The following description is, therefore, not to be taken in a limiting sense.

Various embodiments of the present invention provide a virtual-to-physical address translation mechanism for a shared-memory multiprocessor that scales efficiently to large numbers of processors. This mechanism supports a single virtual address format (e.g., using load or store instructions), and detects whether a reference for the instruction is to the local node or a remote node. If to a local node, or if remote translation is not enabled, the virtual-to-physical address translation is performed in the local translation look-aside buffer (TLB), producing a physical address that includes both the physical node number and the physical memory offset within that node. If remote translation is enabled, however, and the virtual address is for a remote node (as determined by comparing the virtual node field of the virtual address with the value representing the local virtual node number), then a remote address translation mechanism is used, as follows. A physical node number is determined by adding the virtual node field of the virtual address to a physical base node. The virtual node number is also checked against a limit value, to ensure that the request is within allowable bounds. The remainder of the virtual address forms a virtual offset, which is sent with the memory request to the destination physical node. A "global address space identifier" (GASID) is also looked up for the local processor and sent with the request. The GASID and the upper portion of the virtual address are used to index into a remote translation table (RTT) at the destination node, to produce a physical page number at the remote node. The RTT is sized to cover the entire virtual address space at a single node. The use of the GASID allows multiple applications, with overlapping virtual address ranges, to share memory on the same node while all using the remote translation mechanism. Essentially, the GASID forms a unique extension to the virtual address offset for each application.

The address translation mechanism of these embodiments scales to large system sizes, because each node keeps track of virtual-to-physical page mappings for its node only. The TLB is used for references to the local node by the local processor, and the RTT at a node is used for incoming references to the local node from remote nodes. A single virtual address format and access mechanism are used for both local and remote memory references. The use of remote translation is thus functionally transparent. The RTT keeps a full map of the remote virtual address space, and each node is able to manage its virtual-to-physical address mapping independently.

FIG. 1 illustrates a specific hardware environment in which various embodiments of the present invention may be practiced. In one embodiment, the hardware environment is included within the Cray SV2 System Architecture, which represents the convergence of the Cray T3E and the traditional Cray parallel vector processors. The SV2 is a highly scalable, cache coherent, shared-memory multiprocessor that uses powerful vector processors as its building blocks, and implements a modernized vector instruction set. It is to be noted that FIG. 1 illustrates only one example of a hardware environment, and other environments (for other embodiments) may also be used.

FIG. 1 illustrates a block diagram of a node that includes four multi-streaming processors (MSP's), according to one embodiment. In this embodiment, node 100 includes each MSP 102 in a four MSP system. Each MSP 102 includes four P chips and four E chips. Node 100 is contained on a single printed circuit board. The sixteen M chips on node 100 contain memory controllers, network interfaces and cache coherence directories with their associated protocol engines. The memory system is sliced across the 16 M chips, round robin by 32-byte cache lines. Each M chip supports one slice. Bits 5 and 6 of the physical address determine the E chip within a processor, and bits 7 and 8 further specify one of four M chips connected to each E chip.

Each M chip resides in one of sixteen independent address slices of the machine, and the interconnection network provides connectivity only between corresponding M chips on different nodes. All activity (cache, memory, network) relating to a line of memory stays within the corresponding slice. Each M chip controls a separate sector of a slice. Slices expand (get more memory in each) as nodes are added so the number of sectors in each slice is equal to the number of nodes in a system.

Total peak local memory bandwidth for one node is 204.8 GB/s, or 51.2 GB/s per MSP. As each MSP 102 needs a maximum bandwidth of about 45 GB/s, there is bandwidth to support network traffic and I/O without greatly impacting computational performance. Each M chip contains two network ports, each 1.6 GB/s peak per direction.

Node 100 also contains two I chip I/O controller ASIC's. These connect to the M chips and provide four I/O ports of 1.2 GB/s bandwidth, full duplex, off node 100. Each I chip contains two ports, 400 MB/s full duplex connections to 8 of the local M chips (one I chip connects to the even M chips and the other connects to the odd M chips), and a 1.6 GB/s full duplex connection to the other I chip. The total I/O bandwidth per module is thus 4.8 GB/s full duplex.

The memory on node 100 is distributed across the set of 16 M chips. Each M chip directly controls the resources contained on two daughter boards so that there are thirty two daughter boards on node 100. The memory chips in the daughter boards are Direct Rambus DRAM. These chips have 16 internal banks and have 18 data pins that each run, with a 400 MHz clock, at an 800 Mbaud rate. Each chip then has a 1.6 GB/s read/write data rate. Being 18 bits wide, additional parts to support ECC are not needed. Daughter cards contain 16 chips organized into 4 memory channels of 4 chips each. Each memory channel is independent. Channels have a peak data bandwidth of 1.6 GB/s, so that the card supports a bandwidth of 6.4 GB/s. With 16 banks in a memory chip, a channel has 64 memory banks. Daughter cards with 64 Mbit, 128 Mbit, 256 Mbit or 512 Mbit chips are supported. The design also accommodates chip densities of 1 Gbit if and when they become available, assuming they fit in the design envelope (size, power, etc.). As the memory parts are 18 bits wide instead of 16 in order to support ECC, the chip's bit densities are actually 72, 144, 288, 576 and 1,152 Mbits.

Figure 2A:
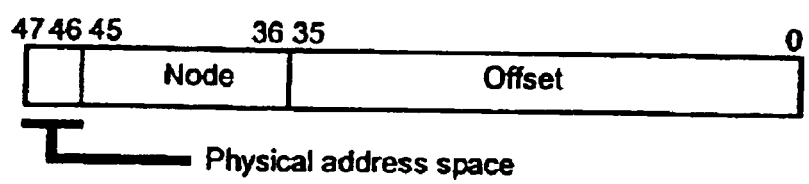
FIG. 2A illustrates a format for a physical memory address, according to one embodiment of the present invention.

FIG. 2A illustrates a format for a physical memory address, according to one embodiment. In this embodiment, a 46-bit (64 TBytes) physical memory address is supported. The node size for this embodiment is a board containing four MSP's and 16 M chips. Physical memory address format 200 contains bits 47 . . . 0. Bits 35 . . . 0 represent an offset (into memory). Bits 45 . . . 36 represent the node. Bits 47 . . . 46 represent the physical address space. The physical memory format allows for up to 1,024 nodes (4,096 MSP's) and 64 GBytes of physical memory per node. Physical pages are allocated on a per-node basis. That is, any given physical page is distributed uniformly across the 16 sectors (the memory controlled by a given M chip) of a single node. This embodiment provides three parallel, physical address spaces, which are selected by two extra bits at the top of the physical address.

Figure 2B:
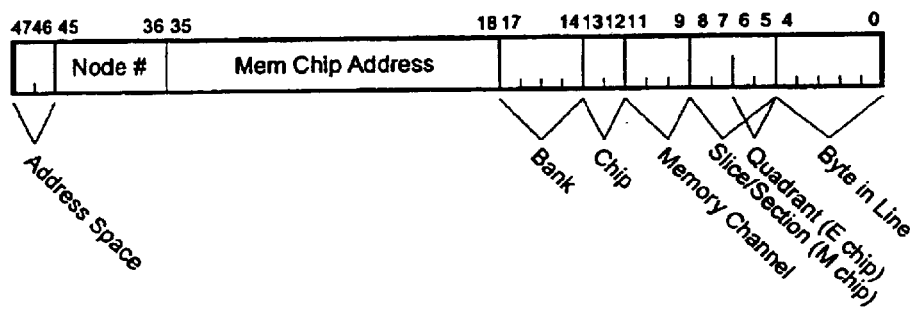
FIG. 2B illustrates a more detailed map of the physical memory address format shown in FIG. 2A, according to one embodiment of the present invention.

FIG. 2B illustrates a more detailed map of the physical memory address format shown in FIG. 2A, in one embodiment. The mapping of a physical address to a destination location is dependent on the hardware implementation (as opposed to being specified in the user-level architecture). Address mapping must be done so that parallelism can be easily exploited by having the map such that multiple transactions can be requested and satisfied simultaneously with minimum hardware complexity. Bits 4 . . . 0 represent the byte in the line. Bits 6 . . . 5 represent the quadrant (E chip). Bits 8 . . . 5 collectively represent the slice/section (M chip). Bits 11 . . . 9 represent the memory channel. Bits 13 . . . 12 represent the memory chip for the memory channel, and bits 17 . . . 14 represent the bank for the memory chip. Bits 35 . . . 18 represent the memory chip address, and bits 45 . . . 36 represent the node number (in the system). Bits 47 . . . 46 represent the address space. Memory size options and configuration changes (including memory degrades) can modify this map. The map supports memory chips up to 1 Gbit density. There are three address spaces: coherent main memory, memory-mapped register space, and I/O device space. Coherent main memory may be cached.

Figure 3:
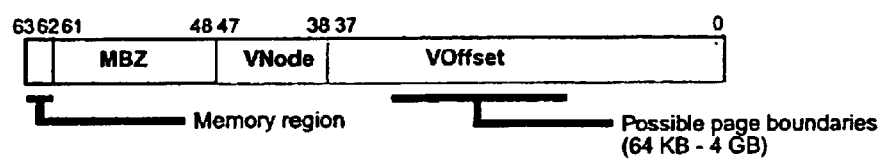
FIG. 3 illustrates a format for a virtual memory address, according to one embodiment of the present invention.

FIG. 3 illustrates a format for a virtual memory address, according to one embodiment. In this embodiment, virtual memory address format 300 contains a 64-bit virtual address space. Bits 37 . . . 0 represent a virtual offset into virtual memory space, wherein potential page boundaries range from 64 KB to 4 GB. Bits 47 . . . 38 represent the VNode (i.e., virtual node). This is used by the hardware when performing remote address translation. Bits 61 . . . 48 must be set to zero (represented in FIG. 3 as "MBZ" for "Must Be Zero") in this implementation. This is used by the hardware when performing remote address translation. Bits 61 . . . 48 must be set to zero (represented in FIG. 3 as "MBZ" for "Must Be Zero") in this implementation. Bits 63 . . . 62 specify the memory region, which determines the type of address translation used in kernel mode. The virtual address space can be considered a flat virtual address space for uniprocessor, or symmetric multiprocessing applications. As stated, this embodiment supports eight page sizes ranging from 64 KB to 4 GB. Thus, the page boundary can vary, from between bits 15 and 16, to between bits 31 and 32.

In various embodiments of the invention, virtual addresses used for instruction fetches and data references are first translated into physical addresses before memory is accessed. These embodiments support two forms of address translation: source translation, and remote translation. The first form of address translation is source translation, in which a virtual address is fully translated by a Translation Look-aside Buffer (TLB) on a local P chip to a physical address on an arbitrary node. The second form of address translation is remote translation, in which the physical node number is determined by a simple translation of the virtual address VNode field, and the remaining virtual address VOffset field is sent to the remote node to be translated into a physical address offset via a Remote-Translation Table (RTT). The type of address translation performed is based upon values in a configuration control register and the virtual address itself. Remote translation is performed if all of the following three conditions are true: (1) Remote translation is enabled (e.g., a flag contained in the configuration control register is set); (2) The virtual address is to the useg region (Bits 63 . . . 62=00 in the virtual address); and (3) The virtual address references a remote node (Bits 47 . . . 38 in the virtual address are not equal to a local node value contained in the configuration control register). If any of the above conditions are false, then source translation is performed. Remote translation can be enabled/disabled on a per-processor basis.

Figure 4:
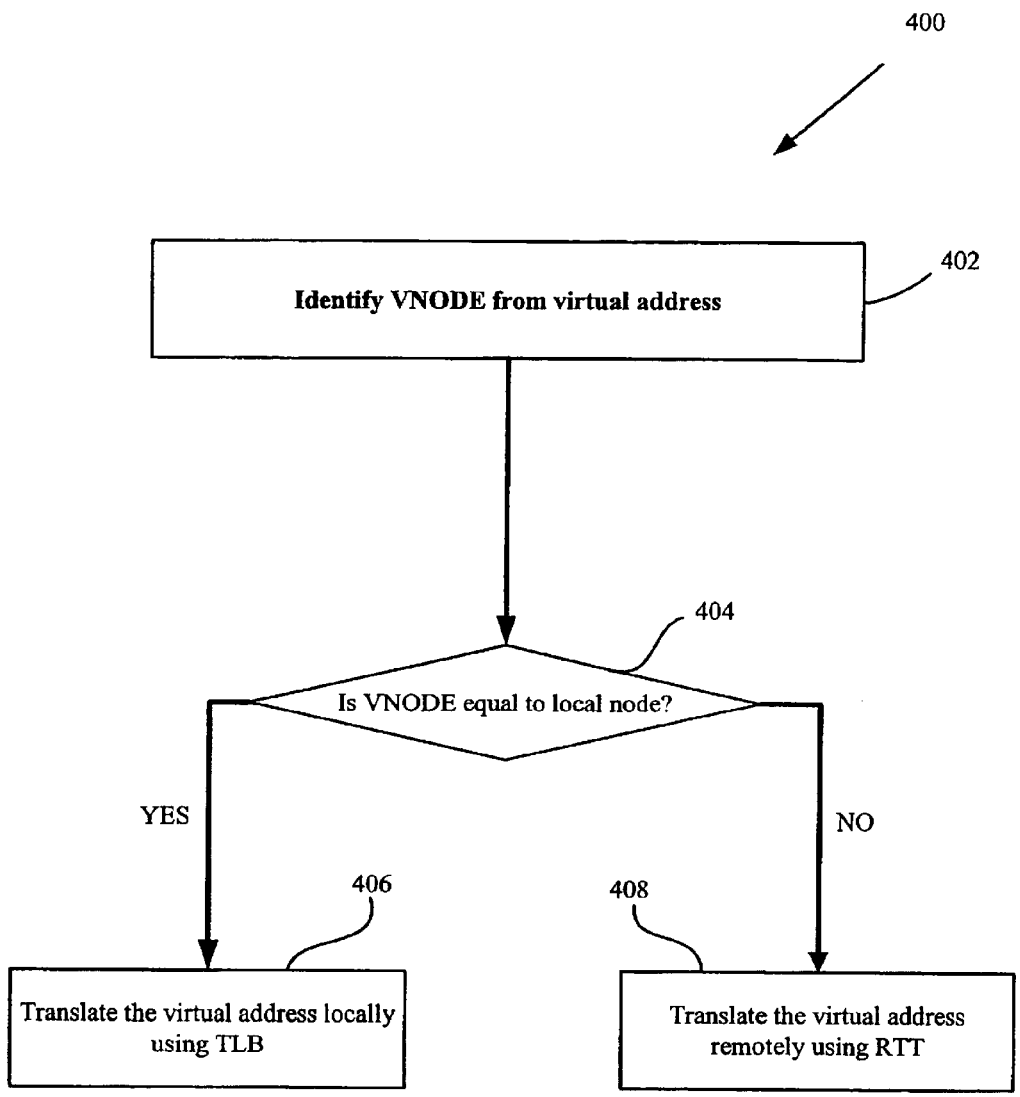
FIG. 4 illustrates a flow diagram for analyzing a VNode field in the virtual memory address, according to one embodiment of the present invention.

FIG. 4 illustrates a flow diagram for analyzing a VNode field in the virtual memory address, according to one embodiment of the present invention. Flow diagram 400 includes blocks 402, 406, and 408, and also includes checkpoint 404. Flow diagram 400 illustrates one way in which a virtual memory address can be translated into a physical memory address (in either local or remote memory space). Block 402 includes identifying the virtual node from a virtual address. In one implementation, a local node can identify the virtual node by looking at the VNode field of the virtual address. Checkpoint 404 determines if the virtual node is the same as, or equal to, the local node. If so, flow diagram 400 continues to block 406, wherein the virtual address is translated into a physical address locally using a Translation Look-Aside Buffer (TLB). The local node is then able to address local physical memory space. If the virtual node is not the same as the local node, then flow diagram 400 continues to block 408, wherein the virtual address is translated into a physical address remotely (on a remote node) using a Remote-Translation Table (RTT). In this fashion, the local node is effectively able to address remote memory space of the remote node.

Figure 5:
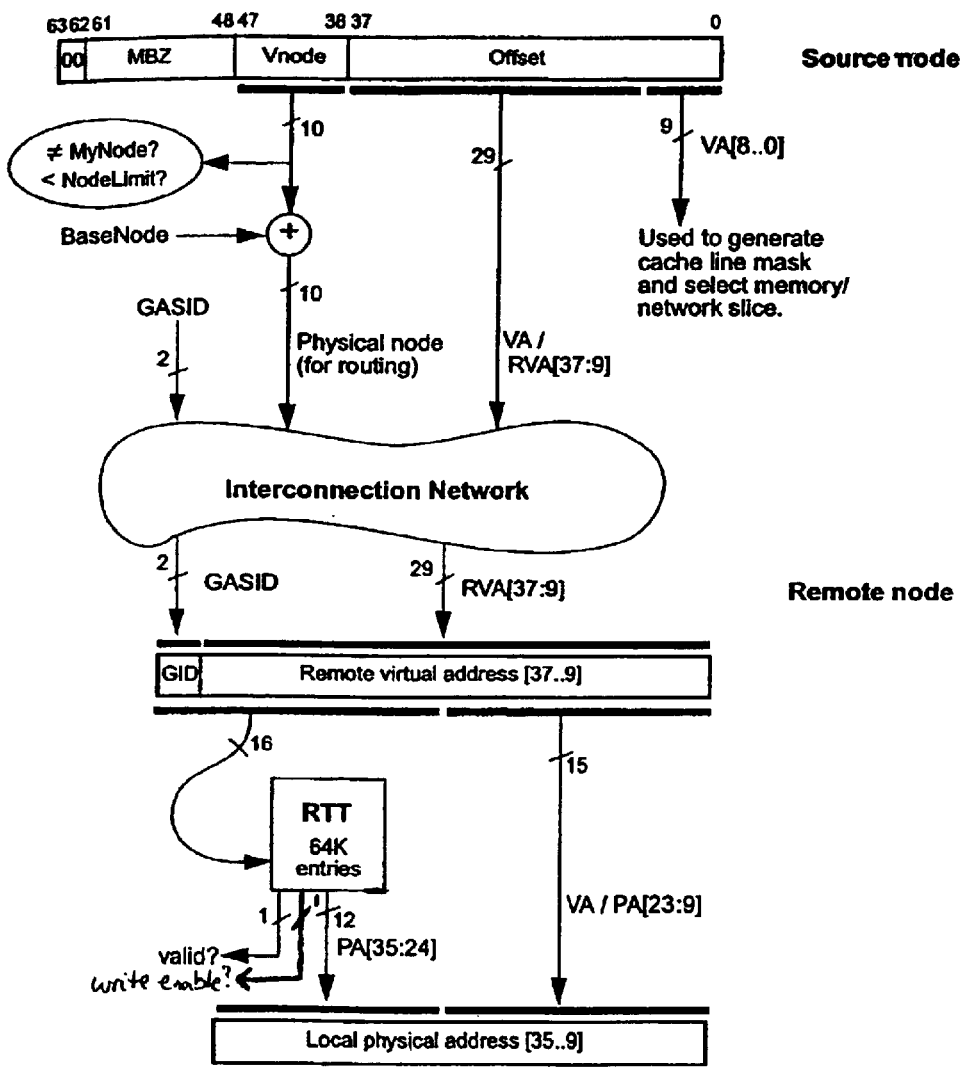
FIG. 5 illustrates a detailed flow diagram for implementing remote translation of a virtual memory address, according to one embodiment of the present invention.

FIG. 5 illustrates a detailed flow diagram 500 for implementing remote translation of a virtual memory address, according to one embodiment of the present invention. When remote translation is enabled, the hardware treats bits 47 . . . 38 of the Virtual Address (i.e., VA47 . . . 38, for the the VNode field) as a virtual node number. As described above, all useg virtual addresses with a VNode value not matching the local virtual node number are translated remotely. Additionally, the address is checked to make sure it does not exceed the user's partition defined by the Node-Limit field in the TLBcontrol register. If VA47 . . . 38>NodeLimit, then an Address Error exception occurs.

The physical node number for the address is computed by adding VA47 . . . 38 to the BaseNode value from the TLBcontrol register. (In this instance, the BaseNode is a reference mechanism by which the physical node number can be computed.) Overflow on this 10-bit addition is ignored; the OS must never create a partition (via the BaseNode and NodeLimit values) that exceeds the number of nodes in the machine. The virtual address Offset field (VA37 . . . 0) is sent to the resulting physical node as a "remote virtual address"(RVA) to complete the translation. (The RVA could also be referred to as a remote virtual memory address.) The cache allocation is forced to non-allocate and the reference is not cached (Get/Put semantics).

The value of the BaseNode is unique to each node. This creates a unique physical node mapping when adding the BaseNode to the VNode field. Therefore, in one implementation, various nodes can use common, contiguous VNodes (starting at 0, for example) to effectively reference different physical nodes (that are used for routing). Table 1 below illustrates an example of physical (destination) node mapping for three different source nodes A, B, and C.

TABLE 1

Physical Node Calculation

| Source Node | VNode | Physical Node |
|---|---|---|
| A (Base Node = 100) | 0 | 100 |
| A | 1 | 101 |
| A | 2 | 102 |
| B (Base Node = 200) | 0 | 200 |
| B | 1 | 201 |
| B | 2 | 202 |
| C (Base Node = 300) | 0 | 300 |
| C | 1 | 301 |
| C | 2 | 302 |

In another embodiment, a look-up table is used to determine the physical node. In this embodiment, the BaseNode calculation is not required.

RVA requests bypass the Ecache (in the E chips), since they can never be cached. The M chips contain a set of four, 2-bit Global Address Space ID (GASID) registers, one for each of the local MSP's. When the local M chip sends a packet out the network with an RVA, it includes the value of the two bit GASID for the originating MSP. This is used to qualify the remote translation of the RVA at the destination M chip. Thus, the 2-bit GASID, and the RVA, are routed through the interconnection network. Bits 8 . . . 0 of the virtual address are not routed as such, because bits 8 . . . 5 are used to select the memory/network slice, and bits 4 . . . 0 are used to generate the cache line word mask. The cache line mask is unneeded for the remote translation mechanism, and the slice information is also unneeded, since the remote transfer operations have an implied slice (from an M chip on one node to a corresponding M chip on the remote node).

At the remote M chip, remote virtual addresses go through a translation to a pure physical address. This translation takes place before presenting the packet to the directory protocol engine. Remote translation takes place with a granularity of 16 MB. The two GASID bits, and bits 37 . . . 24 of the RVA, are used to index into a 64K-entry Remote-Translation Table (RTT). Each entry of this table contains a valid bit, a write-enable bit, and a 12-bit value representing PA35 . . . 24 (the 16 MB physical page frame). These bits are appended to the lower bits of the RVA to form a physical memory address at the remote node. The valid bit is used for status of the translation. The valid bit indicates whether the RTT was able to translate the virtual memory address into a valid physical memory address space on the remote node. The write-enable bit, or flag, indicates whether a write is permitted to a region referenced by the virtual memory address. A write to this region will only be allowed if the write-enable bit is set.

In one embodiment, the RVA is formed from one or more portions of the virtual address having the VNode field. In another embodiment, the RVA includes a virtual memory address, wherein the virtual memory address is translated into a physical memory address using the RTT.

Figure 6A:
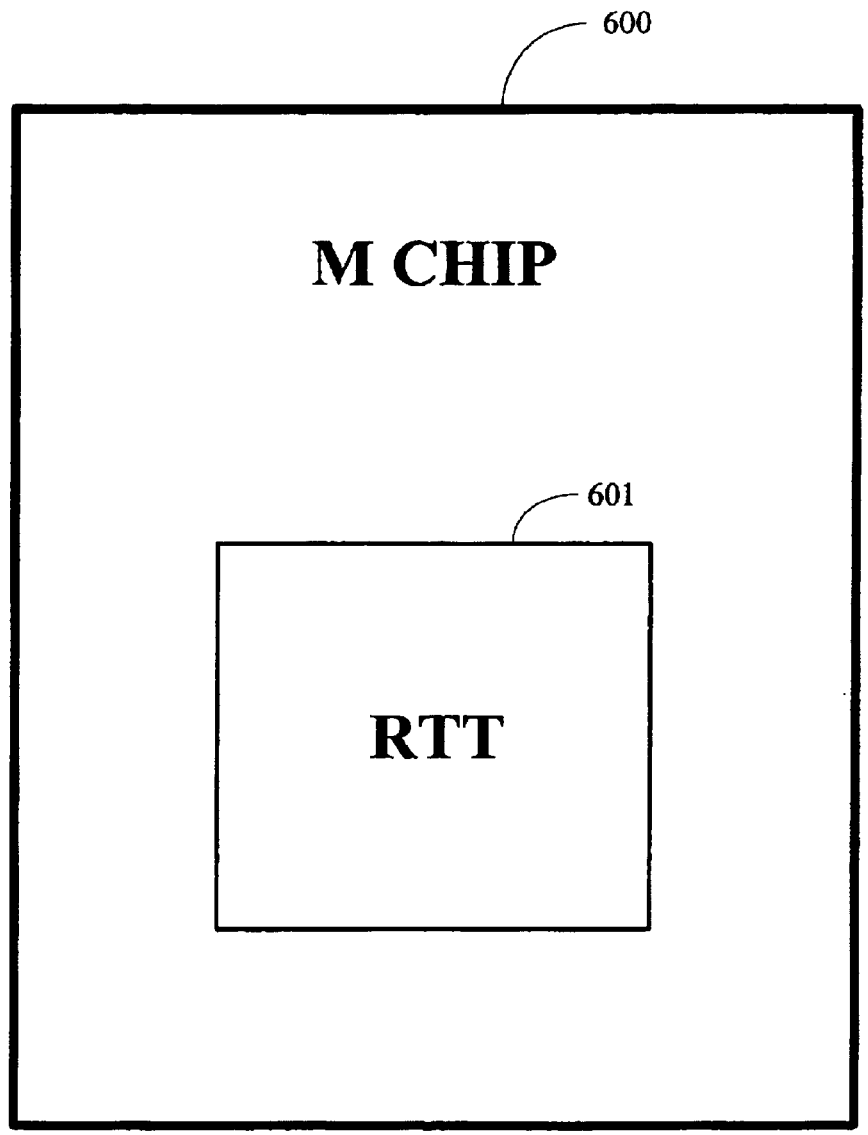
FIG. 6A illustrates a block diagram of a remote-translation table (RTT) resident on an M chip, according to one embodiment of the present invention.

FIG. 6A illustrates a block diagram of a remote-translation table (RTT) resident on an M chip, according to one embodiment of the present invention. M chip 600 on a given node in a multi-node system includes RTT 601.

Figure 6B:
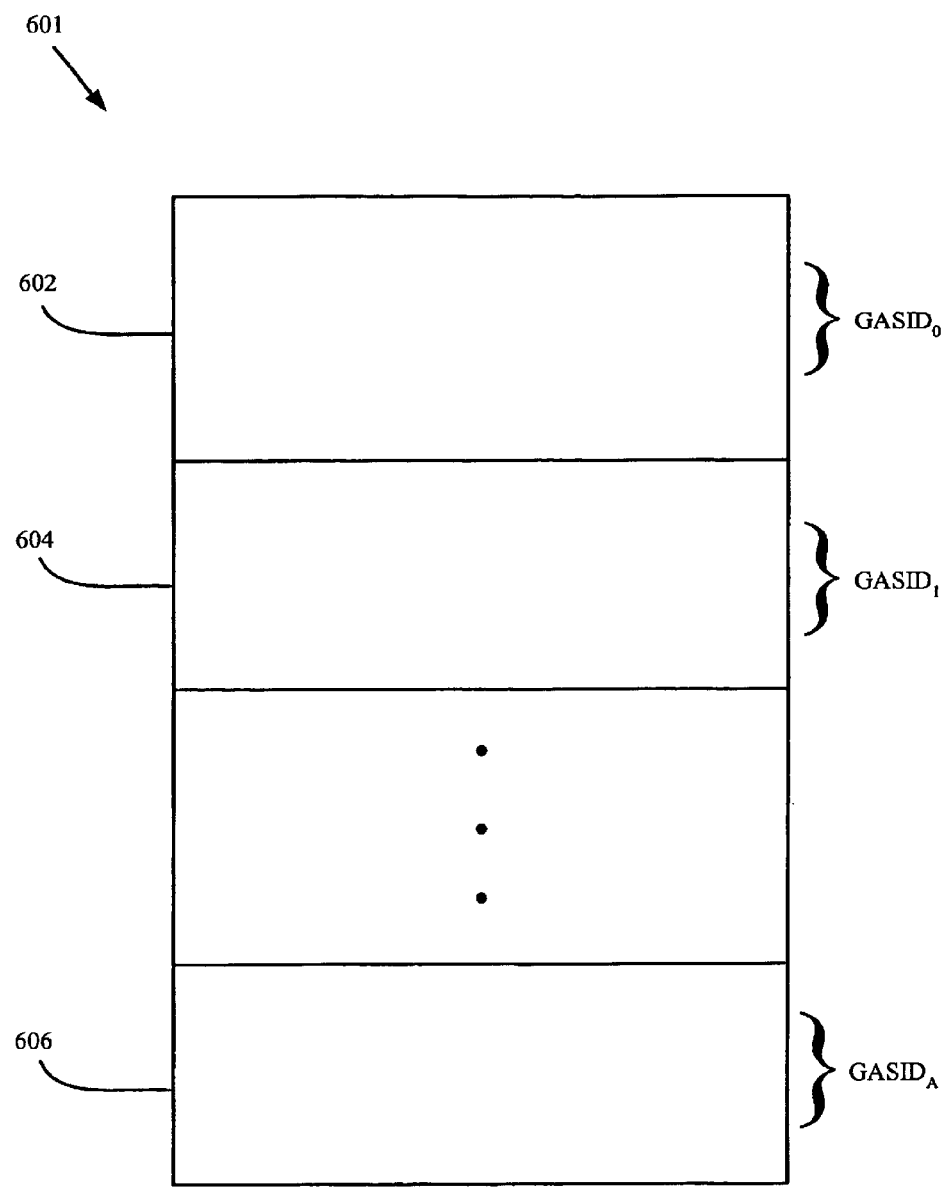
FIG. 6B illustrates a more detailed diagram of the RTT shown in FIG. 6A, according to one embodiment of the present invention.

FIG. 6B illustrates a more detailed diagram of the RTT shown in FIG. 6A, according to one embodiment on the invention. RTT 601 is indexed by a GASID and high-order bits of an RVA. The GASID comprises the highest-order bits of the index into RTT 601. RTT 601 is partitioned into various sections. Because the GASID comprises the highest-order bits, this embodiment shows RTT 601 being partitioned into sections corresponding to the different GASID's. In one implementation, these GASID's are associated with specific applications (or processors) operating on a MSP. RTT 601 includes section 602 for translation information corresponding to $GASID_0$ (at the top of RTT 601 ). Section 602 will not necessarily include translation information that is contiguous (i.e., in order). The information will be ordered as it is implemented by the application use for $GASID_0$. RTT 601 contains translation information for the entire virtual memory address space for the node on which it resides, and therefore not all of the information in section 602 is used, or contiguous (if used). Section 604 includes translation information corresponding to $GASID_1$, and section 606 includes translation information corresponding to $GASID_A$.

In one implementation, the index into RTT 601 includes 2 high-order bits for the GASID, and 14 high-order bits from the RVA, thereby producing a 16-bit index into RTT 601. In this implementation, there are four GASID's (from the 2 GASID bits), and therefore A is equal to 3. RTT 601 includes 64K entries ($2^{16}$), and each of sections 602, 604, and 606 includes 16K entries, wherein not all of the entries are necessarily applicable, or used, for the remote translation mechanism.

Figure 6C:
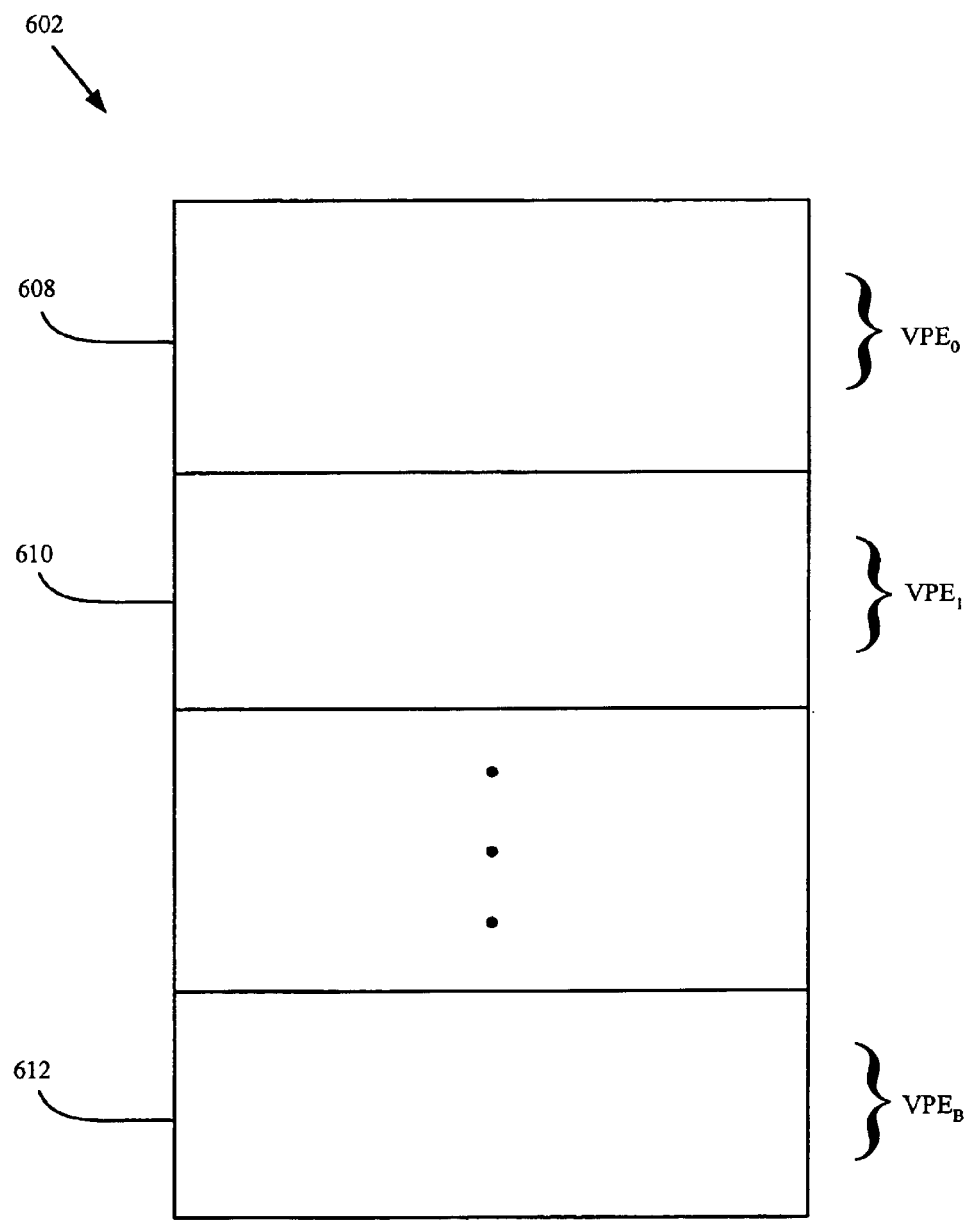
FIG. 6C illustrates a more detailed view of a portion of the RTT shown in FIG. 6B, according to one embodiment of the present invention.

FIG. 6C illustrates a more detailed view of a portion of the RTT shown in FIG. 6B, according to one embodiment of the invention. FIG. 6C illustrates a detailed view of section 602 (corresponding to $GASID_0$) in RTT 601. In this embodiment, certain high-order bits of the RVA used to index into RTT 601 correspond to virtual processing elements (VPE) on a given node. Translation information is ordered within section 602 according to the VPE to which it is associated. Section 608 includes information corresponding to $VPE_0$. Section 610 includes information corresponding to $VPE_1$, and section 612 includes information corresponding to $VPE_B$.

In one implementation, there are 4 VPE's (in a MSP system), and therefore B is equal to 3. In this implementation, each of sections 608, 610, and 612 includes 4K entries (for this portion of RTT 601).

Figure 6D:
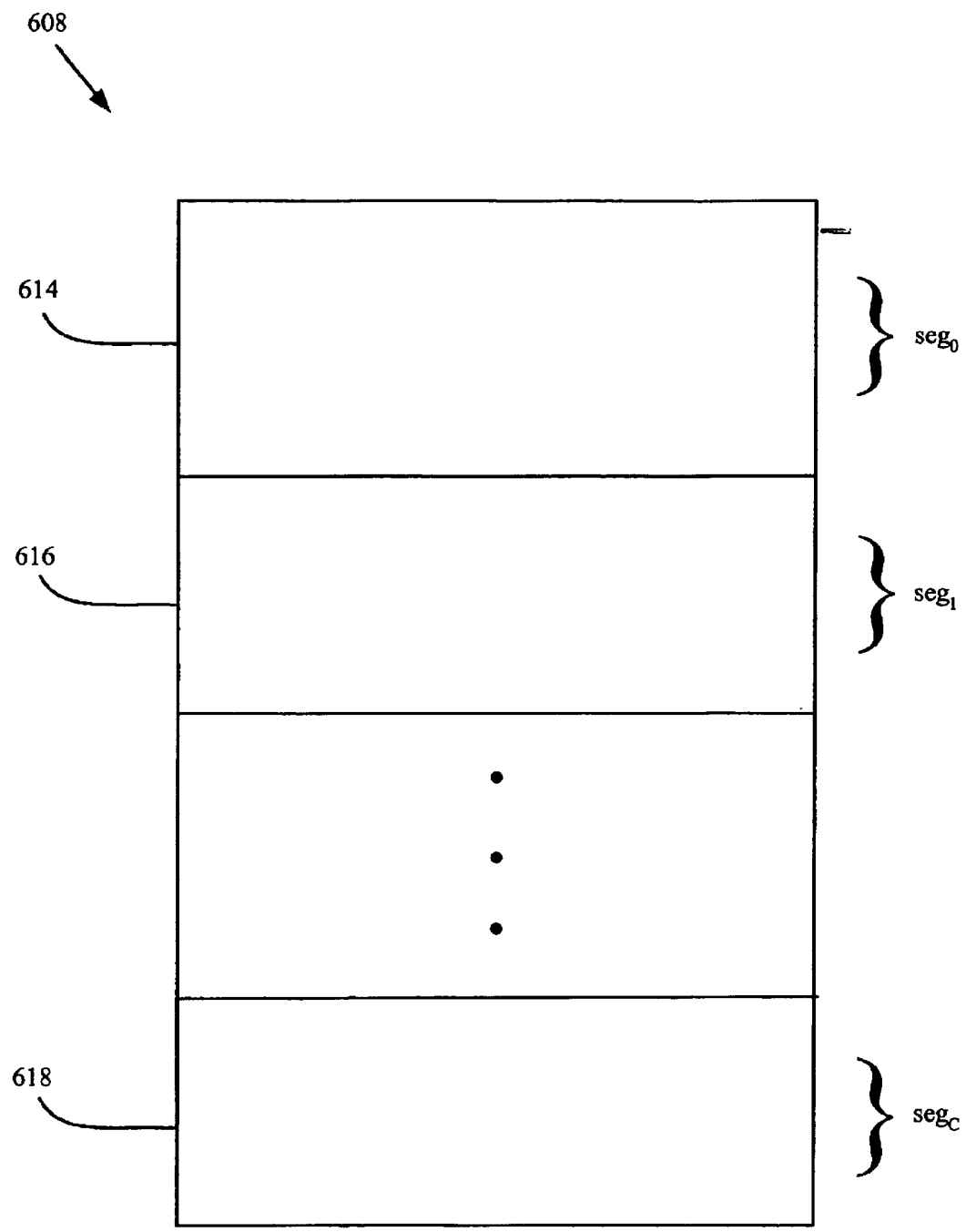
FIG. 6D illustrates an even further detailed view of a portion of the RTT shown in FIG. 6C, according to one embodiment of the present invention.

FIG. 6D illustrates an even further detailed view of a portion of the RTT shown in FIG. 6C, according to one embodiment of the invention. FIG. 6D illustrates a detailed view of section 608 (corresponding to $VPE_0$) in RTT 601. In this embodiment, certain bits of the RVA used to index into RTT 601 correspond to segments. Information is ordered within section 608 according to the segment to which it is associated. Section 614 includes information corresponding to $seg_0$. Section 616 includes information corresponding to $seg_1$, and section 618 includes information corresponding to $seg_C$.

As described herein, the various embodiments of the present invention provide a number of advantages. For example, an RTT provides a scalable address translation mechanism, and is designed to avoid translation faults in large systems (unlike a regular TLB design). The RTT supports full mapping of all the memory in a machine (unlike various networking cards) to allow full load/store access to all the memory in the system. Such a system allows each node to independently manage its own virtual-to-physical memory mapping. Such a system also removes the need to implement conventional TLB "shootdown." Conventional TLB "shootdown" occurs when a node changes a local virtual-to-physical page mapping, and has to invalidate all of the TLB entries throughout the system that contain that mapping. The use of an RTT that supports full mapping removes the need to implement such an approach. These and other advantages are provided for by various embodiments of the present invention.

Although specific embodiments have been illustrated and described herein, it will be appreciated by those of ordinary skill in the art that any arrangement that is calculated to achieve the same purpose may be substituted for the specific embodiment shown. For example, other variations of the described embodiments may not include multistream processors (MSP's), or a sliced memory system. Such variations may include any number of processors (including one) at a node. This application is intended to cover these and other adaptations or variations of the described embodiments of the present invention.

What is claimed is:

1. A method for remotely translating a virtual memory address into a physical memory address in a multi-node system, the method comprising:
providing the virtual memory address at a source node;
determining that the virtual memory address is to be sent to a remote node;
sending the virtual memory address to the remote node; and
translating the virtual memory address on the remote node into a physical memory addressing using a remote-translation table (RTT),
wherein the RTT contains translation information for an entire virtual memory address space associated with the remote node.

2. The method of claim 1, wherein the determining that the virtual memory address is to be sent to the remote node includes determining that a virtual node field does not match the source node.

3. The method of claim 1, wherein the sending includes sending the virtual memory address to the remote node via an interconnection network.

4. The method of claim 1, wherein the translating of the virtual memory address using the RTT includes generating a status flag to indicate whether the RTT is able to translate the virtual memory address into a valid physical memory address space on the remote node.

5. The method of claim 1, wherein the translating of the virtual memory address using the RTT includes
generating a write-enable flag to indicate whether a write is permitted to a region referenced by the virtual memory address, and
preventing the write from occurring if the write-enable flag is not set.

6. The method of claim 1, wherein the method further comprises sending a global address space identifier (GASID) to the remote node along with the virtual memory address, and wherein the translating includes using the GASID to translate the virtual memory address into a physical memory address.

7. A computerized method implemented in a multi-node system, the computerized method comprising;
providing a virtual memory address at a source node as a function of a virtual address from a load or a store instruction;
determining a virtual node identifier from the virtual memory address;
determining a physical node identifier of a remote node according to the virtual node identifier and a reference mechanism;
sending a remote virtual memory address to the remote node identified by the physical node identifier; and
translating the remote virtual memory address on the remote node into a physical memory address.

8. The computerized method of claim 7, wherein the determining the physical node identifier of a remote node according to the virtual node identifier includes combining the virtual node identifier with a base node identifier to determine the physical node identifier to the remote node.

9. The computerized method of claim 8, wherein the combining includes adding the virtual node identifier to the base node identifier to determine the physical node identifier of the remote node, wherein the base node identifier is maintained by, and unique to, the source node.

10. The computerized method of claim 7, wherein determining the physical node identifier of a remote node according to the virtual node identifier includes using the virtual node identifier as an index into a look-up table to determine the physical node identifier to the remote node.

11. The computerized method of claim 7, wherein the sending of the remote virtual memory address includes sending a remote virtual memory address that includes one or more portions of the virtual memory address.

12. The computerized method of claim 7, wherein the translating includes translating the remote virtual memory address on the remote node into a physical memory address according to a remote-translation table (RTT).

13. The computerized method of claim 7, wherein the computerized method further comprises sending a global address space identifier (GASID) to the remote node along with the remote virtual memory address, and wherein the translating includes translating the remote virtual memory address into a physical memory address based on the GASID.

14. A method for translating a virtual memory address in a multi-node system, the method comprising:
providing a virtual memory address on a local node as a function of a virtual address from a load or a store instruction;
identifying a virtual node associated with the virtual memory address;
determining if the virtual node corresponds to the local node;
translating the virtual memory address into a local physical memory address on the local node, if the virtual node corresponds to the local node; and if the virtual node corresponds instead to a remote node,
sending the virtual memory address to the remote node, and
translating the virtual memory address into a physical memory address on the remote node.

15. The method of claim 14, wherein the translating of the virtual memory address into a local physical memory address includes translating the virtual memory address with a translation look-aside buffer (TLB) on the local node.

16. The method of claim 15, wherein the translating of the virtual memory address with the TLB includes translating the virtual memory address with a TLB that maintains virtual-to-physical memory mappings for only the local node.

17. The method of claim 14, wherein the method further comprises checking a remote-translation indicator on the local node to determine if remote translation is enabled, and wherein the sending of the virtual memory address to the remote node and the translating of the virtual memory address on the remote node occur only if remote translation is enabled and if the virtual node corresponds to the remote node.

18. The method of claim 14, wherein the method further comprises sending a global address space identifier (GASID) to the remote node along with the virtual memory address if the virtual node corresponds to the remote node, and wherein the translating of the virtual memory address into the physical memory address on the remote node includes translating the virtual memory address into the physical memory address based on the GASID.

19. A computerized method for remotely accessing memory by an application in a multi-node system, the computerized method comprising:
providing a virtual memory address on a source node as a function of a virtual address from a load or a store instruction;

determining that the virtual memory address will be sent to a remote node;

determining a global address space identifier (GASID) for a specific application on the source node; sending both the virtual memory address and the GASID to the remote node; and translating the virtual memory address into a physical memory address on the remote node based on the GASID.

20. The computerized method of claim 19, wherein the determining that the virtual memory address will be sent to the remote node includes determining that a virtual node field represents the remote, rather than the source, node.

21. The computerized method of claim 19, wherein the determining of the GASID includes determining that the GAID for the specific application operating on one of a plurality of processors of the source node.

22. The computerized method of claim 19, wherein translating the virtual memory address into a physical memory address includes translating the virtual memory address based on the GASID and at least a portion of the virtual memory address as an index into a remote-translation table (RTT) on the remote node to translate the virtual memory address into the physical memory address.

23. The computerized method of claim 19, wherein the computerized method further comprises:

determining a second global address space identifier (GASID) for a second application on the source node;

sending both the virtual memory address and the second GASID to the remote node; and translating the virtual memory address into the physical memory address on the remote node based on the second GASID.

24. The computerized method of claim 23, wherein the determining of the second GASID includes determining the second GASID for the second application operating on a second processor of the source node.

25. A node comprising:

a processor; and a memory controller operatively coupled to the processor, wherein the memory controller includes a remote-translation table (RTT) that contains translation information for the entire virtual memory address space for the node, wherein the memory controller receives a virtual memory address, and wherein the memory controller translates the virtual memory address into a locally physical memory address of the node according to the RTT.

26. The node of claim 25, wherein the memory controller translates the virtual memory address into the local physical memory address of the node according to the RTT and a global address space identifier (GASID).

27. The node of claim 26, wherein the GASID corresponds to a specific application running on a different node.

28. The node of claim 26, wherein the GASID and at least a portion of the virtual memory address provide the memory controller an index into the RTT to translate the virtual memory address into the local physical memory address.

29. The node of claim 25, wherein the memory controller generates a status flag to indicate whether the RTT is able to translate the virtual memory address into a valid local physical memory address on the node.

30. The node of claim 25, wherein the RTT contains write-enable flags to indicate whether writes are enabled for various regions of virtual memory, and wherein the memory controller does not perform a write if the virtual memory address references a region for which writes are not enabled.

31. The node of claim 25, wherein the node further comprises:

a second processor; and a second memory controller operatively coupled to the second processor, wherein the second memory controller includes a second remote-translation table (RTT) that contains translation information for the entire virtual memory address space for the node, wherein the second memory controller receives a second virtual memory address, and wherein the second memory controller translates the second virtual memory address into a second local physical memory address of the node according to the second RTT.

32. A multi-node system for implementing remote address translation, the system comprising:

a network;

a source node coupled to the network; and a remote node coupled to the network and including a remote-translation table (RTT), wherein the source node determines a virtual node identifier for a virtual memory address as a function of a virtual address from a load or a store instruction, determining a physical node identifier of the remote node according to the virtual node identifier in accordance with a reference mechanism, wherein the source node sends a remote virtual memory address to the remote node according to the physical node identifier, and wherein the remote node translates the remote virtual memory address into a physical memory address.

33. The multi-node system of claim 32, wherein the source node sends a remote virtual memory address that includes one or more portions of the virtual memory address.

34. The multi-node system of claim 32, wherein the source node also sends a global address space identifier (GASID) to the remote node along with the remote virtual memory address, and wherein the remote node translates the remote virtual memory address into a physical memory address based on the GASID.

35. A multi-node system for implementing remote address translation, the system comprising:

means for identifying a virtual node associated with a virtual memory address as a function of a virtual address from a load or a store instruction;

means for determining if the virtual node corresponds to a local node;

means for translating the virtual memory address into a local physical memory address on the local node, according to a first reference mechanism; and means for sending the virtual memory address to a remote node and translating the virtual memory address into a physical memory address on the remote node, according to a second reference mechanism.

* * * * *

UNITED STATES PATENT AND TRADEMARK OFFICE
CERTIFICATE OF CORRECTION

PATENT NO. : 6,922,766 B2  Page 1 of 1
DATED : July 26, 2005
INVENTOR(S) : Steven L. Scott It is certified that error appears in the above-identified patent and that said Letters Patent is hereby corrected as shown below:

Column 6,
Line 21, after "for" delete "the".

Column 9,
Line 16, after "wherein" delete "the".

Column 12,
Line 30, delete "for" and insert -- from --, therefor.

Signed and Sealed this

Eighteenth Day of October, 2005

JON W. DUDAS
*Director of the United States Patent and Trademark Office*